A. A. HENDERSON.
Reaping and Mowing Machine.

No. 29,593.

Patented Aug. 14, 1860.

Witnesses:

Inventor:
Andrew A Henderson

UNITED STATES PATENT OFFICE.

ANDREW A. HENDERSON, OF PHILADELPHIA, PENNSYLVANIA.

IMPROVEMENT IN REAPING AND MOWING MACHINES.

Specification forming part of Letters Patent No. 29,593, dated August 14, 1860.

*To all whom it may concern:*

Be it known that I, ANDREW A. HENDERSON, passed assistant surgeon of the United States Navy, of Philadelphia, in the county of Philadelphia and State of Pennsylvania, have invented a new and useful Machine for Reaping and Raking Grain and Mowing; and I do hereby declare that the following is a full and clear description of the same, reference being had to the accompanying drawings, making part of this specification, in which—

Figure 1:
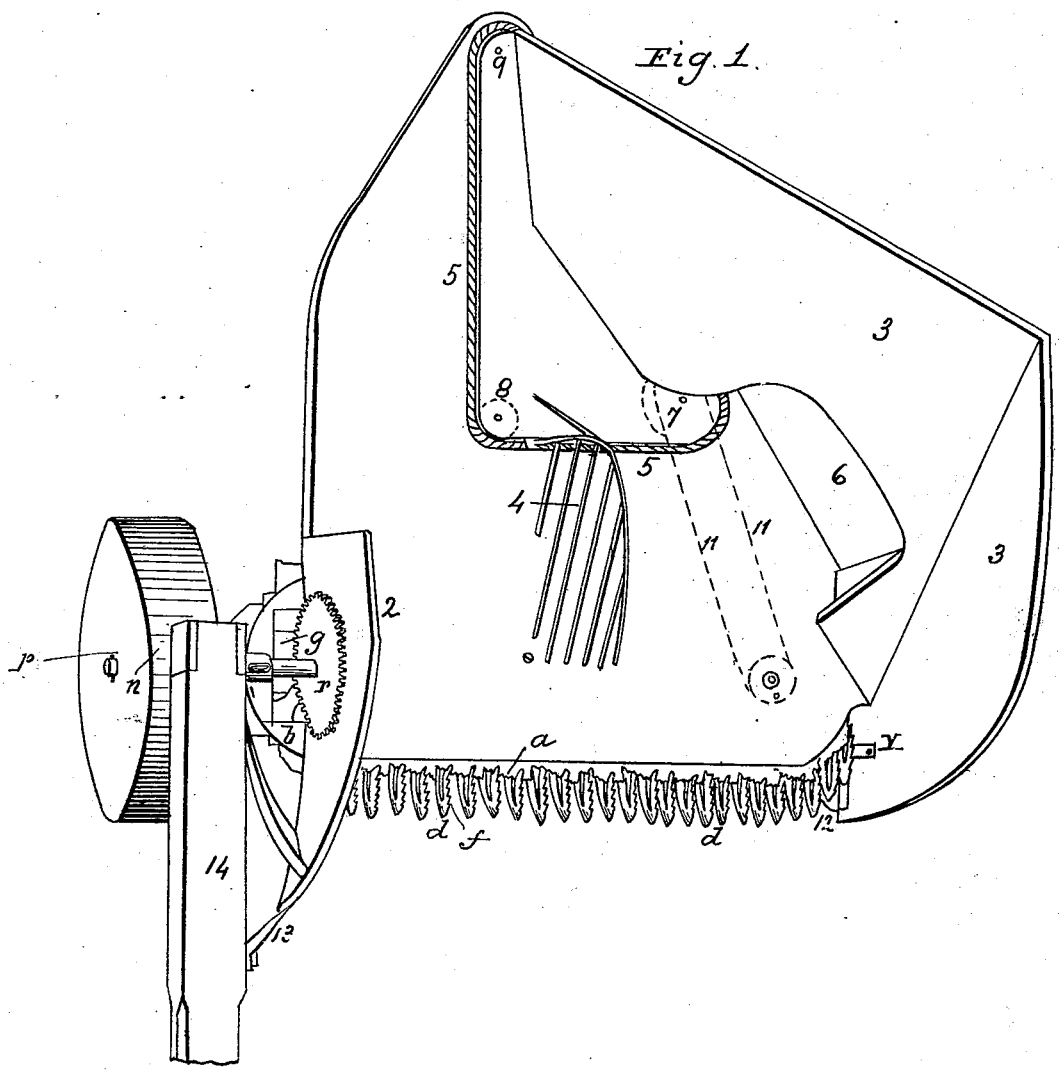
Figure 2:
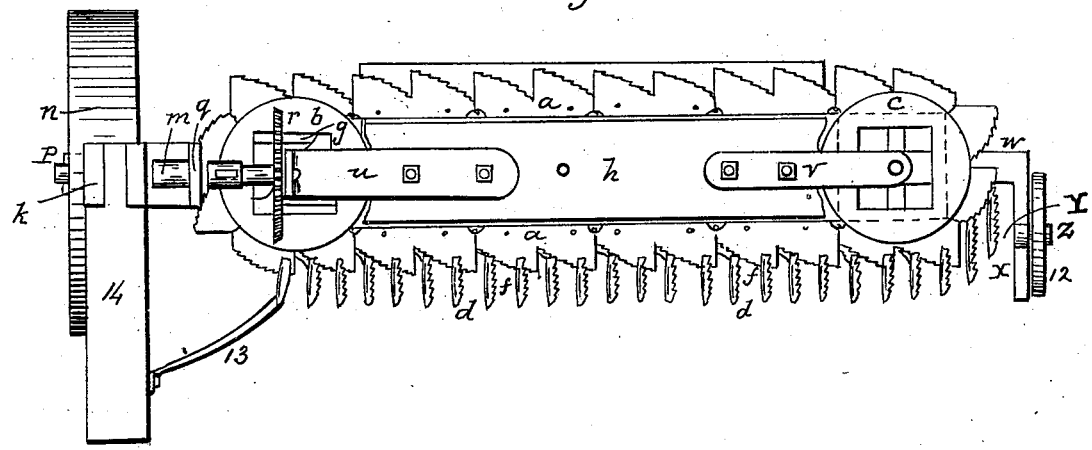
Figure 3:
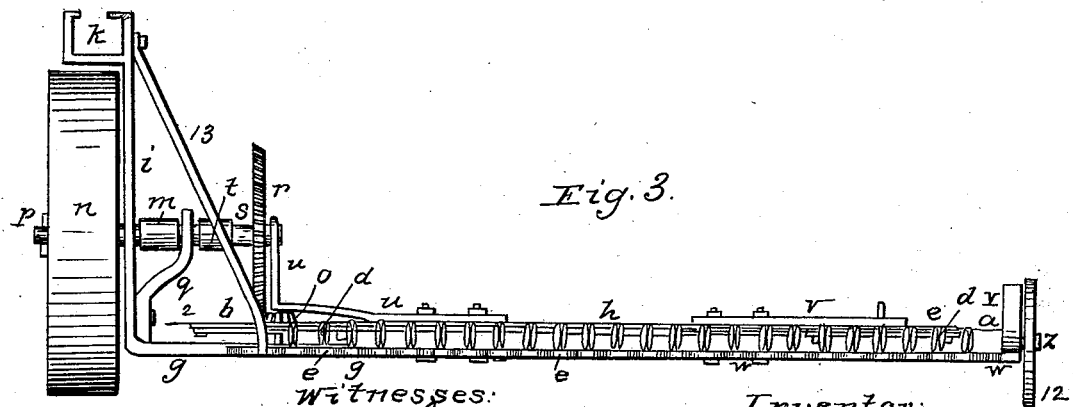

Figure 1 is a perspective view of the machine as fitted for reaping and raking. Fig. 2 is a view from above of the machine with the covering-board, raking apparatus, and side board removed. Fig. 3 is a front view of the machine as represented in Fig. 2.

$a$, Figs. 1, 2, 3, is an endless chain with blades or sickles for cutting riveted upon its upper surface; $b$, Figs. 1, 2, 3, outer pulley with cogs on upper surface, giving motion to chain; $c$, Figs. 2, 3, inner pulley, around which the chain of sickles moves; $d$, Figs. 1, 2, 3, prongs which enter the standing grain or grass, toothed on one side; $e$, Fig. 3, bar to which prongs are attached; $f$, Figs. 1, 2, tooth on one side of the prong $d$; $g$, Figs. 1, 2, 3, a strong piece of iron bent at a right angle; $h$, Figs. 2, 3, a piece of wood connecting opposite sides of the machine; $i$, Fig. 3, upright part of iron piece $g$; $k$, Figs. 1, 2, 3, socket for receiving the tongue; $l$, Fig. 3, position of hole in $i$ through which the axle $m$ works; $m$, Figs. 2, 3, axle of wheel $n$; $n$, Figs. 1, 2, 3, outer wheel running on the ground and giving motion to cutting and raking apparatus. It is of wood and fits on square extremity of preceding. $o$, Fig. 3, cogs upon outer pulley, $b$; $p$, Figs. 1, 2, 3, pin securing wheel $n$ upon its axle; $q$, Figs. 2, 3, a piece of iron supporting inner extremity of the axle $m$; $r$, Figs. 1, 2, 3, cog-wheel giving motion to the outer pulley, $b$. One end of its axle works in the end of the axle $m$, the other in the upright part of the iron piece $u$. $s$, Figs. 1, 2, 3, axle of the cog-wheel $r$; $t$, Figs. 1, 2, 3, a sliding ring attached to $s$, and taking hold of a pin on $m$ for connecting or disconnecting the wheels $n$ and $r$; $u$, Figs. 2, 3, a piece of iron supporting the axle of cog-wheel and pivot of the outer pulley, bolted to $h$; $v$, Figs. 2, 3, a bar of iron supporting pivot of inner pulley, bolted to $h$; $w$, Figs. 2, 3, a bar of iron bolted to $h$ with preceding and supporting inferior end of the pivot of the inner pulley; $x$, Fig. 2, extremity of piece $w$ bent forward; $y$, Figs. 1, 2, 3, an upright piece of iron upon part $x$, with several holes, into which screws the bolt $z$; $z$, Figs. 2, 3, a bolt forming the pivot or axle of the inner wheel running upon the ground; No. 1, Fig. 1, bed upon which the grain is received; 2, Fig. 1, outer side board; 3, Fig. 1, inner side board; 4, Fig. 1, rake; 5, Fig. 1, an endless rope, to which rake is attached, working in a groove in a bed receiving the grain; 6, Fig. 1, opening in inner side board through which the rake enters; 7 8 9, Fig. 1, position of three pulleys around which the rope carrying the rake works; 10, Fig. 1, position of a pulley fitting on the squared pivot of $c$; 11, Fig. 1, position of an endless rope giving motion to pulley No. 7 and the raking apparatus; 12, Figs. 1, 2, 3, inner wheel or truck supporting the machine on the ground; 13, Figs. 1, 2, 3, a brace connected with the tongue; 14, Figs. 2, 3, tongue.

My invention consists in an apparatus for raking the grain from the machine at intervals and in such quantities as to form a sheaf, which it deposits so far from the standing grain as not to be in the way of the machine on its return to the same part of the field. It consists of a rake, 4, with obliquely-descending prongs, attached by an upright part to an endless rope or chain, 5, which carries it across the bed $i$, on which the grain falls. The endless rope 5 moves around three pulleys fixed in the bed 1 in the positions marked 7 8 9. The pulley at 7 has a double groove, the lower receiving an endless rope or belt passing from a fourth pulley, fixed in the bed 1 at the point marked 10. The latter (10) has its pivot perforated with a square hole to receive the squared pivot of the inner pulley of the sickle-chain $c$, so that the two move together. The rope carrying the rake derives its motion, therefore, from the pulley 10 through the endless robe 11, giving motion to the pulley at 7. The rake attached to the rope (in a groove, 5) moves across the bed 1, carrying the grain against the outer side board, where, as it revolves around the pulleys 8, its prongs enter the straw after the manner of a pitchfork, and carry it backward and push it from the machine. The rake passing back to the pulley 9 makes a rapid turn, sufficient to completely disengage itself, passes behind and under cover to the obliquely-placed inner side board, 3, and returns through an opening in the same to repeat the process. The whole raking apparatus and the inner side board, 3, are attached to the bed 1, which is simply a floor of an inch or two in thickness, and easily removed for mowing. The machine running upon an inner detached wheel, 12, and an outer larger one, $n$, motion is given through the axle of the latter to the sickles and rake when drawn forward upon the ground by horses. The oblique edges of the sickles, taking hold of the grain rather upon one side, will carry it into the teeth of the prongs $d$, where it will be prevented from yielding further—an effect aided by the vibration resulting from the passage of lengthened links around the pulleys. The use of one set of cogs of the wooden wheel $n$, easily removed for another of less diameter in mowing, giving increased velocity to the sickles where most needed, and the arrangement for disconnecting the axles $m$ and $s$, simplify the machine. A seat for the driver may be fixed on the tongue. In mowing, the bed 1, with rake and inner side board, are to be replaced by a narrow board covering the sickles.

What I claim as my invention, and desire to secure by Letters Patent, is—

The rake 4, having an upright part and obliquely-descending prongs, in combination with the endless chain or rope, arranged and operating as described, for the purpose of discharging the grain in gavels at intervals.

ANDREW A. HENDERSON.

Witnesses:
NATHL. D. MILLER,
JACOB G. CROCKETT.